US006707596B2

United States Patent
Tomiya

(10) Patent No.: US 6,707,596 B2
(45) Date of Patent: Mar. 16, 2004

(54) DIGITAL MIRROR DEVICE PROJECTOR AND METHOD OF CONTROLLING AMOUNT OF LIGHT BEING USED IN DIGITAL MIRROR DEVICE PROJECTOR

(75) Inventor: Shu Tomiya, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 0 days.

(21) Appl. No.: 10/390,748

(22) Filed: Mar. 19, 2003

(65) Prior Publication Data

US 2003/0179435 A1 Sep. 25, 2003

(30) Foreign Application Priority Data

Mar. 22, 2002 (JP) ........................................ 2002-080854

(51) Int. Cl.$^7$ ............................................... G02B 26/00
(52) U.S. Cl. ........................... 359/291; 348/687; 700/19
(58) Field of Search ............................... 359/290, 291; 348/254, 255, 657, 658, 671, 673, 687; 700/19

(56) References Cited

U.S. PATENT DOCUMENTS 6,188,933 B1 * 2/2001 Hewlett et al. ................ 700/19
6,411,425 B1 * 6/2002 Kowarz et al. .............. 359/291

FOREIGN PATENT DOCUMENTS

JP            10-78550 A      3/1998

* cited by examiner

Primary Examiner—Huy Mai
(74) Attorney, Agent, or Firm—Sughrue Mion, PLLC

(57) ABSTRACT

A digital mirror device (DMD) projector including: a voltage-controllable light source; a color wheel with color filters; a DMD panel having a plurality of mirror elements each being controlled so as to be put in a first inclination and a second inclination states and reflecting light fed from the light source through any one of the color filters while being put in the first inclination state, as the image light, in a first direction, and reflecting light fed through any one of the color filters while being put in the second inclination state in a second direction; an image controller to control so as to put the mirror elements in the first or the second inclination state according to a gray level signal; a photo-sensor being placed in such a position where the light reflected from the mirror elements is incident when the mirror elements is in the second inclination state and, whereby the photo-sensor receives the reflected light and converts the received light to a voltage; a reference voltage source to generate a predetermined reference voltage; and a voltage controller to compare the predetermined reference voltage generated in the reference voltage source with the voltage output from the photo-sensor, and to control the amount of the light fed from the light source so that the voltage is matched to the predetermined reference voltage.

16 Claims, 2 Drawing Sheets

DIGITAL MIRROR DEVICE PROJECTOR AND METHOD OF CONTROLLING AMOUNT OF LIGHT BEING USED IN DIGITAL MIRROR DEVICE PROJECTOR The present application claims priority of Japanese Patent Application No. 2002-080854 filed on Mar. 22, 2002, which is hereby incorporated by reference.

BACKGROUND OF THE INVENTION

1. Field of the Invention

The present invention relates to a digital mirror device projector using a digital mirror device (hereinafter may be referred simply to as a "DMD") having a plurality of mirror elements and a method of controlling an amount of light being used in the digital mirror device projector, and more particularly to the DMD projector that makes effective use of light being reflected while each of the mirror elements is turned OFF and the method of controlling an amount of light being used in the digital mirror device projector.

2. Description of Related Art

A DMD (Digital Mirror Device) projector is generally known which uses a DMD panel having several hundreds of thousand of mirror elements each being able to control an inclination for being mounted being placed on a semiconductor memory cell and which controls a reflection state by exerting control on the inclination of each of the mirror elements to form an image, which is disclosed in, for example, Japanese Patent Application Laid-open No. Hei 10-78550.

In the disclosed DMD projector, light emitted from a light source is configured to be condensed as a spot on a color wheel, being made up of a plurality of kinds of color filters adapted to selectively let any one of red, green, and blue color light pass and light having passed through any one of the color filters is applied, in a form of a parallel luminous flux, on the DMD panel and image light being light reflected off the DMD panel is projected through a zoom projection lens onto a screen.

As described above, the projector using the DMD forms an image with the reflected light, and brightness of the image is dependent on brightness of the light source. The brightness of the light source varies dependently on an elapsing time and deteriorates gradually after shipment. The projector using the conventional DMD is not considered in this point and has a problem in which an image cannot be projected at constant brightness for a long time, as shown in FIG. 5.

SUMMARY OF THE INVENTION

In view of the above, it is an object of the present invention to provide a projector using a DMD for projecting an image at constant brightness usually.

According to a first aspect of the present invention, there is provided a digital mirror device projector including:

a light source being voltage-controllable for an amount of light;

a color wheel configured by combining a plurality of kinds of color filters for making image light of a plurality of colors;

a digital mirror device panel having a plurality of mirror elements each being controlled so as to be put in a first inclination state and in a second inclination state and reflecting light fed from the light source and passed through any one of the color filters making up the color wheel while being put in the first inclination state, as the image light, in a first direction and reflecting light fed from the light source and passed through any one of the color filters making up the color wheel while being put in the second inclination state in a second direction being different from the first direction;

an image controller to control so as to put each of the mirror elements in the first inclination state or the second inclination state according to a gray level signal as a corresponding video signal;

a photoelectric conversion device being placed as a photo-sensor in such a position where the light reflected from at least one of the mirror elements is incident when the at least one of the mirror elements is in the second inclination state and, whereby the photoelectric conversion device receives the reflected light and converts the received light to a voltage;

a reference voltage source to generate a predetermined reference voltage; and a voltage controller to compare the predetermined reference voltage generated in the reference voltage source with the voltage output from the photoelectric conversion device, and to control the amount of the light fed from the light source, based on a result of the comparison.

In the foregoing first aspect, a preferable mode is one wherein the voltage controller compares the predetermined reference voltage generated in the reference voltage source with the voltage output from the photoelectric conversion device, and to control the amount of the light fed from the light source so that the voltage is matched to the predetermined reference voltage.

Also, a preferable mode is one wherein the color wheel is configured by combining a red color filter, a green color and a blue color filter for making image light of the plurality of colors.

Another preferable mode is one wherein during startup of the digital mirror device projector, the image controller controls so as to put at least one of the mirror elements in the second inclination state, and the voltage controller is configured to control an amount of the light fed from the light source.

Still another preferable mode is one wherein during power-OFF of the digital mirror device projector, the image controller controls so as to put at least one of the mirror elements in the second inclination state, and the voltage controller is configured to control an amount of the light fed from the light source.

A further preferable mode is one wherein during startup of the digital mirror device projector, the image controller controls so as to put all of the mirror elements in the second inclination state, and the voltage controller is configured to control an amount of the light fed from the light source.

A still further preferable mode is one wherein during power-OFF of the digital mirror device projector, the image controller controls so as to put all of the mirror elements in the second inclination state, and the voltage controller is configured to control an amount of the light fed from the light source.

An additional preferable mode is one wherein the image controller outputs a gray level signal to the reference voltage source in addition to the digital mirror device panel, wherein the reference voltage source varies a reference voltage to be generated in accordance with the gray level signal, and whereby during power-ON of the digital mirror device projector, the amount of the light of the light source is controlled by the voltage controller.

According to a second aspect of the present invention, there is provided a light amount control method for controlling an amount of light to be used in a digital mirror device projector made up of a light source being voltage-controllable for an amount of light; a color wheel configured by combining a plurality of kinds of color filters for making image light of a plurality of colors; a digital mirror device panel having a plurality of mirror elements each being controlled so as to be put in a first inclination state and in a second inclination state and reflecting light fed from the light source and passed through any one of the color filters making up the color wheel while being put in the first inclination state, as the image light, in a first direction and reflecting light fed from the light source and passed through any one of the color filters making up the color wheel while being put in the second inclination state in a second direction being different from the first direction; an image controller to control so as to put each of the mirror elements in the first inclination state or the second inclination state according to a gray level signal as a corresponding video signal, the method including:

- a placing step of placing a photoelectric conversion device as a photo-sensor in such a position where light reflected from at least one of the mirror elements is incident when the at least one of the mirror elements is in the second inclination state and, whereby the photoelectric conversion device receives the reflected light and converts the received light to a voltage;
- a predetermining step of predetermining a reference voltage; and
- a controlling step of comparing the predetermined reference voltage with the voltage output from the photoelectric conversion device, and controlling the amount of the light fed from the light source, based on a result of the comparison.

Also, a preferable mode is one wherein, in the controlling step, the amount of the light fed from the light source is controlled so that the voltage is matched to the predetermined reference voltage.

Another preferable mode is one wherein the color wheel is configured by combining a red color filter, a green color and a blue color filter for making image light of the plurality of colors.

Still another preferable mode is one wherein during startup of the digital mirror device projector, an amount of the light fed from the light source is controlled, by having the image controller control so as to put at least one of the mirror elements in the second inclination state.

A further preferable mode is one wherein during power-OFF of the digital mirror device projector, an amount of the light fed from the light source is controlled, by having the image controller control so as to put at least one of the mirror elements in the second inclination state.

A still further preferable mode is one wherein during startup of the digital mirror device projector, an amount of the light fed from the light source is controlled, by having the image controller control so as to put at least one of the mirror elements in the second inclination state.

An additional preferable mode is one wherein during power-OFF of the digital mirror device projector, an amount of the light fed from the light source is controlled, by having the image controller control so as to put at least one of the mirror elements in the second inclination state.

A still additional preferable mode is one wherein the image controller outputs a gray level signal to the reference voltage source in addition to the digital mirror device panel, wherein the reference voltage source varies a reference voltage to be generated in accordance with the gray level signal, and whereby during power-ON of the digital mirror device projector, the amount of the light of the light source is controlled.

With the above configurations, in the projector using the DMD panel, the light irradiated to the DMD panel and the inclination state of each mirror element on the DMD panel are controlled in accordance with the video signal, an angle for reflecting light is changed in the first inclination state and in the second inclination state, the light reflected in the first inclination state advances in the first direction of the screen and a like on which the image is projected, and the light reflected in the second inclination state becomes an electric signal representing a intensity of the light output from the photo-sensor. The voltage of the main power source is changed in accordance with light intensity, thereby projecting the image at a constant brightness always.

The light at a time where the mirror element is turned OFF is used and the intensity of the light is measured to control the power source voltage, thereby achieving the object.

Further, a fixed image is needed to measure the intensity of the light, however, by outputting a specific image pattern for a constant period when the power source is turned OFF, there is no problem.

Also, as to the constant brightness, for example, the power source voltage is set to 80% at shipping and the power source voltage is increased in a manner that brightness of the light source is kept constant, whereby the constant brightness can be kept until the power source voltage becomes maximum.

Additionally, a fixed image is needed when the light intensity is measured. Therefore, for example, a specific image pattern may be output for a constant period at the power-OFF of the DMD projector. Therefore, it is possible to watch images at the constant brightness regardless of brightness variation caused by deterioration of the light source.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENT

Best modes for carrying out the present invention will be described in further detail using an embodiment with reference to the accompanying drawings.

Figure 1:
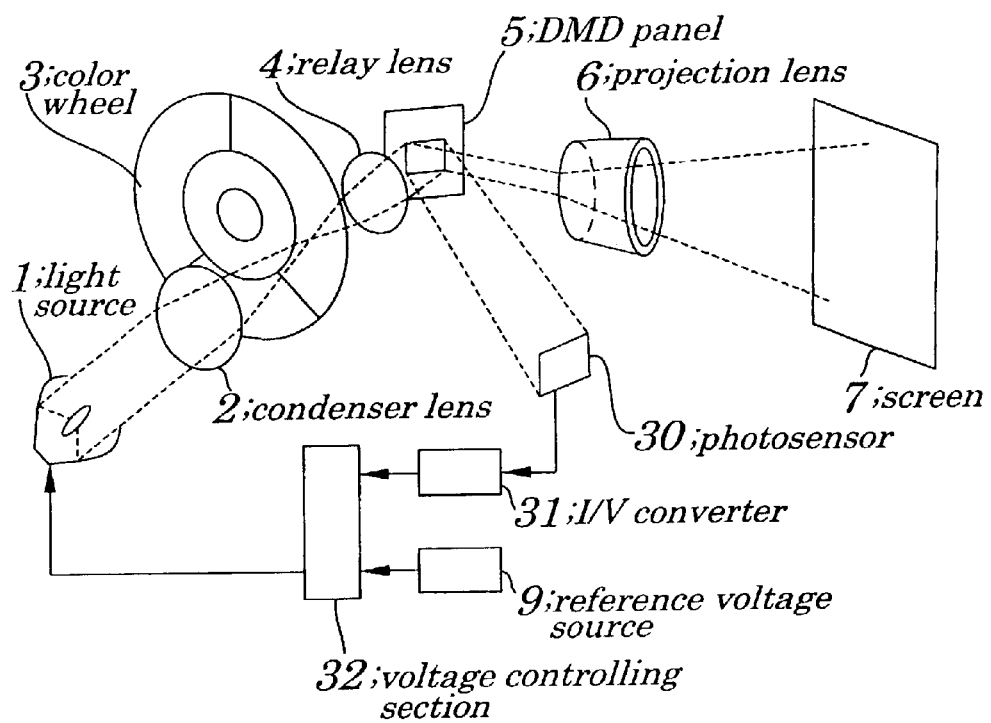
FIG. 1 is a diagram illustrating main components of a single-chip type of projector using a DMD (Digital Mirror Device) panel according to an embodiment of the present invention.

FIG. 1 is a diagram illustrating main components of a single-chip type of projector using a DMD (Digital Mirror Device) panel according to an embodiment of the present invention.

The projector according to the embodiment, as shown in FIG. 1, is provided with a light source 1, a condenser lens 2, a color wheel 3, a relay lens 4, a DMD panel 5, a projection lens 6, a screen 7, a reference voltage source 9, a photo-sensor (photo-electric conversion device) 30, an I/V converter 31, a voltage controlling section 32, and an image controller (not shown).

In this embodiment, an operation of the DMD panel 5 provided with a plurality of mirror elements is controlled by the image controller (not shown) as a driving section. The image controller controls an inclination state of each mirror element to be the DMD panel 5 in accordance with a rotation state of the color wheel 3 and an video signal supplied from an outside of the DMD projector so as to make an image light to be projected on the screen 7.

The light emitted from the light source 1 is condensed by the condenser lens 2 and then is incident on the color wheel 3 so that light is brought into focus on the color wheel 3. An aim of the condensation and application of the light emitted from the light source 1 is to reduce time required for switching colors in the color wheel 3 by reducing a spot diameter of luminous flux of the light. Therefore, as described above, the color wheel 3 is so positioned that the light emitted from the light source 1 is condensed by the condenser lens 2 and the light is brought into focus thereon.

Figure 2:
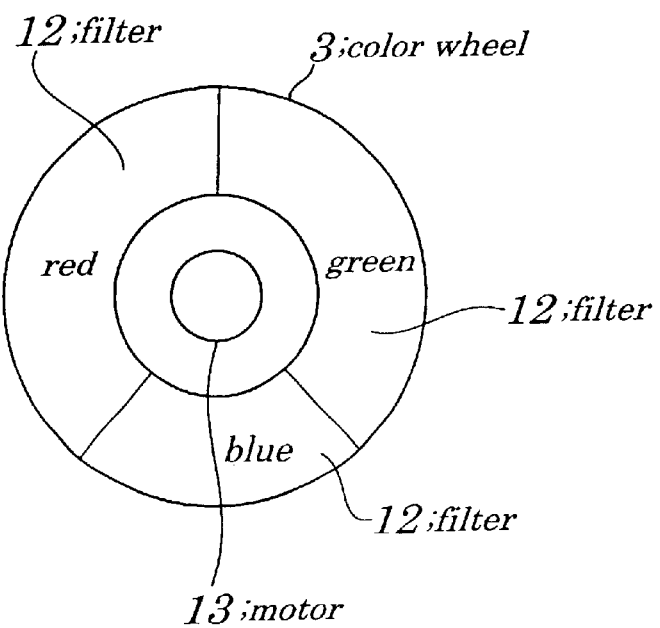
FIG. 2 is a front view of a color wheel employed in the embodiment of the present invention.

FIG. 2 is a front view of the color wheel 3 employed in the embodiment of the present invention.

The color wheel 3, as shown in FIG. 1 and FIG. 2, is made up of a disc having a plurality of kinds of color filters 12, so as to perform filtering on, for example, red, blue, green colors, and a like. The color wheel 3 is rotated at high speed by a motor 13 placed on an axis at its center. Since the light emitted from the light source 1 is condensed by the condenser lens 2 and the condensed light is applied to the color wheel 3, the rotation of the color wheel 3 causes the applied light to be filtered in order of the red, blue, and green colors and the filtered light is output to the relay lens 4.

The light having undergone filtering in such a manner that the light has any one of the red, blue, and green colors by the color wheel 3 travels, while being expanded as shown in FIG. 1, toward the DMD panel 5 and its luminous flux is calibrated by the relay lens 4 so that the light is effectively applied to the DMD panel 5.

The light applied to the DMD panel 5 is incident on each of the mirror elements (not shown) making up the DMD panel 5. The above image controller (not shown) outputs a gray level signal used to control an inclination of each of the mirror elements (not shown) to the DMD panel 5 according to a gray level of each of the red, blue, and green colors represented by a video signal and uses light being reflected off each of the mirror elements (not shown) toward the projection lens 6 as the image light to be projected on the screen 7.

Figure 3:
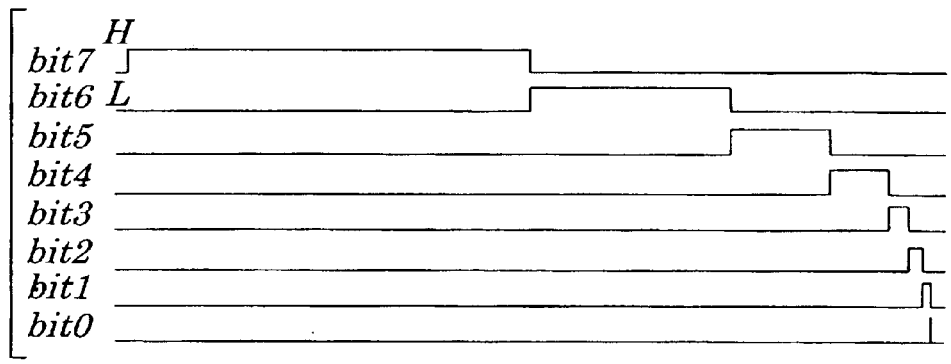
FIG. 3 is a diagram showing a waveform of a driving pulse to control a state of inclination of a mirror element employed in the embodiment of the present invention.

Here, a method of having light reflected off each of the mirror elements (not shown) of the DMD panel 5 express a gray level is described by referring to FIG. 3. FIG. 3 is a diagram showing a waveform of a driving pulse to control a state of inclination of each of the mirror elements (not shown) employed in the embodiment. In FIG. 3, a horizontal direction shows a lapse of time.

Let it be assumed that, as shown in FIG. 3, a gray level signal is made up of, for example, 8 bits each providing a waveform having a different period during which a signal is in a high (H) state in a predetermined unit time. In the example shown in FIG. 3, a highest bit "bit 7" provides a longest period during which a signal is in a high (H) state and a lowest order bit "bit 0" provides a shortest period during which a signal is in a high (H) state. The period during which a signal is in a high (H) state becomes shorter as the "bit 7" is changed sequentially to the "bit 0". When a period during which a signal is in a high (H) state for each of the "bit 7" to "bit 0" is totally summed, the signal becomes high (H) during all the period given in the predetermined time. When a signal to select each bit is "1", a corresponding waveform prepared for each bit is output. The mirror elements (not shown) are inclined only while the waveform is in a high (H) state and the mirror elements (not shown) let incident light be reflected in a direction of the projection lens 6 (screen 7). When a waveform corresponding to each bit is in a low (L) state, the mirror elements (not shown) reflect incident light toward the photo-sensor 30. A gray level of an image is determined by selection of each bit.

Each image light is obtained, as reflection light, by performing the above operations on all mirror elements (not shown) of the DMD panel 5 and when any one of the red, blue, and green colors is applied, and thus the obtained image light is projected at a single picture element on the screen 7. Since revolution of the color wheel 3 is sufficiently fast, previous light stays as an afterimage detected by human eyes and almost no case occurs in which a color looks to have been decomposed.

Next, characteristic configurations of the embodiment are described.

As described above, an image light to be projected on the screen 7 is the image light reflected off the DMD panel 5 according to shades of gray in a projected image. In the embodiment, by using light not used as image light and not projected on the screen 7, an amount of light from the light source 1 is controlled. In the embodiment, light being incident through the relay lens 4, but not being projected on the screen 7 is input to the photo-sensor 30. The photo-sensor 30 outputs a current corresponding to intensity of the incident light and this current is converted to a voltage by the I/V converter 31 and then is output to the voltage controlling section 32.

A reference voltage from the reference voltage source 9 is input to the voltage controlling section 32. The voltage controlling section 32 compares the reference voltage with the voltage from the I/V converter 31 and controls the amount of light of the light source 1 in a manner that the reference voltage becomes equal to the voltage from the I/V converter 31. Therefore, the amount of light of the light source 1 does not vary in accordance with time elapsing but is kept at the amount of light indicated by the reference voltage output from the reference voltage 9.

The amount of light of the light source 1 is controlled by an instruction from a main controller (not shown) for controlling all operations of the DMD projector at a startup or at a power-OFF. At this time, the image controller controls each mirror element in a manner that all light to be incident on the DMD panel 5 reflects toward the photo-sensor 30. With this control, it is possible to measure and to control the amount of light of the light source 1 easily and accurately.

As another control for an amount of light, the gray level signal which the image controller uses for driving the DMD panel 5 may be also output to the reference voltage source 9, and the reference voltage source 9 may change the reference voltage in accordance with the gray level signal. With this configuration, the structure becomes complex, however, it is possible to control the amount of light emitted from the light source 1 while the image is projected on the screen 7, the amount of light is controlled often, and it is possible to watch the image at constant brightness.

Figure 4:
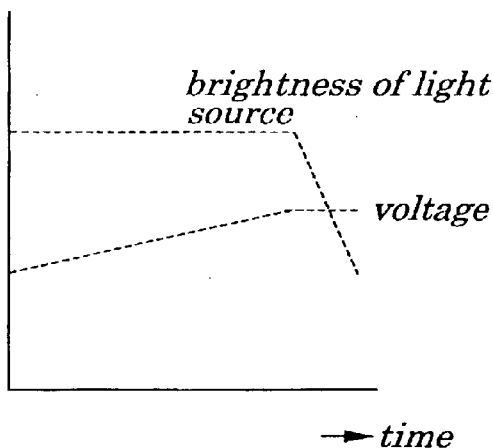
FIG. 4 is a diagram for illustrating a relationship between brightness of a light source and an applied voltage when an amount of light emitted from the light source is controlled according to the embodiment of the present invention.

Now, effects of the control for the amount of light of the light source 1 will be explained with reference to FIG. 4 and FIG. 5. FIG. 4 is a diagram for illustrating a relationship between brightness of a light source and an applied voltage when an amount of light emitted from the light source is controlled according to the embodiment of the present invention, and FIG. 5 is a diagram for illustrating a relationship between brightness of the light source and the applied voltage when the amount of light emitted from the light source is not controlled.

Figure 5:
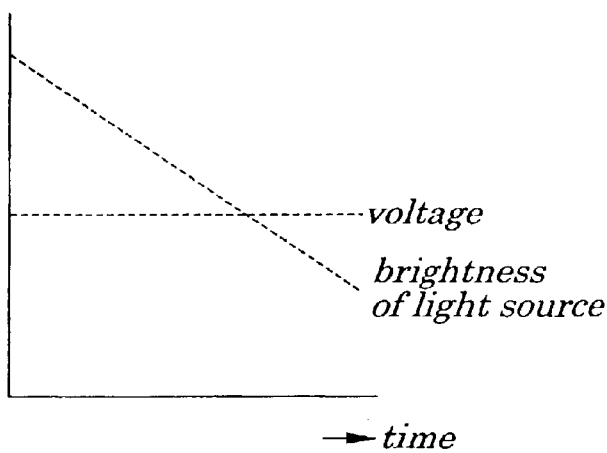
FIG. 5 is a diagram for illustrating a relationship between brightness of the light source and the applied voltage when the amount of light emitted from the light source is not controlled.

As shown in FIG. 5, when a constant voltage is applied, brightness deteriorates gradually caused by the deterioration of the light source 1. When the amount of light emitted from the light source 1 is controlled according to this embodiment, as shown in FIG. 4, it is possible to watch images at constant brightness.

It is thus apparent that the present invention is not limited to the above embodiments but may be changed and modified without departing from the scope and spirit of the invention.

For example, a photo-sensor may be placed in such a position where light reflected from at least one of the mirror elements is incident when the at least one of the mirror elements is in the second inclination state and, whereby the photo-sensor receives the reflected light and converts the received light to a voltage at least one of the mirror elements may be used so as to represent another mirror element or a specified group of the mirror elements.

What is claimed is:

1. A digital mirror device projector including:
   a light source being voltage-controllable for an amount of light;
   a color wheel configured by combining a plurality of kinds of color filters for making image light of a plurality of colors;
   a digital mirror device panel having a plurality of mirror elements each being controlled so as to be put in a first inclination state and in a second inclination state and reflecting light fed from said light source and passed through any one of said color filters making up said color wheel while being put in said first inclination state, as said image light, in a first direction and reflecting light fed from said light source and passed through any one of said color filters making up said color wheel while being put in said second inclination state in a second direction being different from said first direction;
   an image controller to control so as to put each of said mirror elements in said first inclination state or said second inclination state according to a gray level signal as a corresponding video signal;
   a photoelectric conversion device being placed as a photo-sensor in such a position where the light reflected from at least one of said mirror elements is incident when said at least one of said mirror elements is in said second inclination state and, whereby said photoelectric conversion device receives the reflected light and converts the received light to a voltage;
   a reference voltage source to generate a predetermined reference voltage; and
   a voltage controller to compare said predetermined reference voltage generated in said reference voltage source with said voltage output from said photoelectric conversion device, and to control said amount of said light fed from said light source, based on a result of the comparison.

2. The digital mirror device projector according to claim 1, wherein said voltage controller compares said predetermined reference voltage generated in said reference voltage source with said voltage output from said photoelectric conversion device, and to control said amount of said light fed from said light source so that said voltage is matched to said predetermined reference voltage.

3. The digital mirror device projector according to claim 1, wherein said color wheel is configured by combining a red color filter, a green color and a blue color filter for making image light of said plurality of colors.

4. The digital mirror device projector according to claim 1, wherein during startup of said digital mirror device projector, said image controller controls so as to put at least one of said mirror elements in said second inclination state, and said voltage controller is configured to control an amount of said light fed from said light source.

5. The digital mirror device projector according to claim 1, wherein during power-OFF of said digital mirror device projector, said image controller controls so as to put at least one of said mirror elements in said second inclination state, and said voltage controller is configured to control an amount of said light fed from said light source.

6. The digital mirror device projector according to claim 1, wherein during startup of said digital mirror device projector, said image controller controls so as to put all of said mirror elements in said second inclination state, and said voltage controller is configured to control an amount of said light fed from said light source.

7. The digital mirror device projector according to claim 1, wherein during power-OFF of said digital mirror device projector, said image controller controls so as to put all of said mirror elements in said second inclination state, and said voltage controller is configured to control an amount of said light fed from said light source.

8. The digital mirror device projector according to claim 1, wherein said image controller outputs a gray level signal to said reference voltage source in addition to said digital mirror device panel, wherein said reference voltage source varies a reference voltage to be generated in accordance with said gray level signal, and whereby during power-ON of said digital mirror device projector, said amount of said light of said light source is controlled by said voltage controller.

9. A light amount control method for controlling an amount of light to be used in a digital mirror device projector made up of a light source being voltage-controllable for an amount of light; a color wheel configured by combining a plurality of kinds of color filters for making image light of a plurality of colors; a digital mirror device panel having a plurality of mirror elements each being controlled so as to be put in a first inclination state and in a second inclination state and reflecting light fed from said light source and passed through any one of said color filters making up said color wheel while being put in said first inclination state, as said image light, in a first direction and reflecting light fed from said light source and passed through any one of said color filters making up said color wheel while being put in said second inclination state in a second direction being different from said first direction; an image controller to control so as to put each of said mirror elements in said first inclination state or said second inclination state according to a gray level signal as a corresponding video signal, said method comprising:
   a placing step of placing a photoelectric conversion device as a photo-sensor in such a position where light reflected from at least one of said mirror elements is incident when said at least one of said mirror elements is in said second inclination state and, whereby said photoelectric conversion device receives said reflected light and converts the received light to a voltage;

a predetermining step of predetermining a reference voltage; and a controlling step of comparing said predetermined reference voltage with said voltage output from said photoelectric conversion device, and controlling said amount of said light fed from said light source, based on a result of the comparison.

10. The light amount control method according to claim 9, wherein, in said controlling step, said amount of said light fed from said light source is controlled so that said voltage is matched to said predetermined reference voltage.

11. The light amount control method according to claim 9, wherein said color wheel is configured by combining a red color filter, a green color and a blue color filter for making image light of said plurality of colors.

12. The light amount control method according to claim 9, wherein during startup of said digital mirror device projector, an amount of said light fed from said light source is controlled, by having said image controller control so as to put at least one of said mirror elements in said second inclination state.

13. The light amount control method according to claim 9, wherein during power-OFF of said digital mirror device projector, an amount of said light fed from said light source is controlled, by having said image controller control so as to put at least one of said mirror elements in said second inclination state.

14. The light amount control method according to claim 9, wherein during startup of said digital mirror device projector, an amount of said light fed from said light source is controlled, by having said image controller control so as to put all of said mirror elements in said second inclination state.

15. The light amount control method according to claim 9, wherein during power-OFF of said digital mirror device projector, an amount of said light fed from said light source is controlled, by having said image controller control so as to put all of said mirror elements in said second inclination state.

16. The light amount control method according to claim 9, wherein said image controller outputs a gray level signal to said reference voltage source in addition to said digital mirror device panel, wherein said reference voltage source varies a reference voltage to be generated in accordance with said gray level signal, and whereby during power-ON of said digital mirror device projector, said amount of said light of said light source is controlled.

* * * * *